(12) United States Patent
Hyun et al.

(10) Patent No.: US 6,347,165 B1
(45) Date of Patent: Feb. 12, 2002

(54) WAVELENGTH DEMULTIPLEXER WITHOUT WAVEGUIDE BENDING LOSS

(75) Inventors: Kyung-Sook Hyun; Byueng-Su Yoo, both of Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/416,413

(22) Filed: Oct. 12, 1999

(30) Foreign Application Priority Data

Nov. 12, 1998 (KR) ............................................ 98-48439

(51) Int. Cl.[7] ............................... G02B 6/26; G02B 6/42
(52) U.S. Cl. ............................................ 385/15; 385/24
(58) Field of Search ............................. 385/24, 37, 46, 385/48, 42, 122, 130; 359/124, 127, 130

(56) References Cited

U.S. PATENT DOCUMENTS

| | | | |
|---|---|---|---|
| 4,913,507 A | * 4/1990 | Stamnitz et al. | 385/122 |
| 5,243,672 A | 9/1993 | Dragone | 385/46 |
| 5,515,460 A | * 5/1996 | Stone | 385/24 |
| 5,636,300 A | * 6/1997 | Keck et al. | 385/24 |
| 5,675,675 A | 10/1997 | Trouchet | 385/24 |
| 5,751,872 A | 5/1998 | Bissessur et al. | 385/37 |
| 6,134,361 A | * 10/2000 | Urino | 385/42 |
| 6,141,467 A | * 10/2000 | Doerr | 385/24 |
| 6,181,848 B1 | * 1/2001 | Bruno et al. | 385/24 |

OTHER PUBLICATIONS

Amersfoort et al., "Phased–array wavelength demultiplexer with flattened wavelength response," *IEEE Electronics Letters*, 30(4):300–302, 1994.

Chen and Dragone, "A Proposed Design for Ultralow–Loss Waveguide Grating Routers," *IEEE Photonics Technology Letters*, 10(3):379–381, 1998.

Vreeburg, "A Low–Loss 16–Channel Polarization Dispersion–Compensated PHASAR Demultiplexer," *IEEE Photonics Technology Letters*, 10(3):382–384, 1998.

Hyun et al., "8 Channel Dispersion–controlled Phased Array Demultiplexer in InP/InGaAsP," *IEEE Conference Proceedings of 11th LEOS Annual Meeting*, Orlando, Florida, pp. 317–318, 1998.

* cited by examiner

*Primary Examiner*—Hemang Sanghavi
*Assistant Examiner*—Scott Knauss
(74) *Attorney, Agent, or Firm*—Seed IP Law Group, PLLC

(57) ABSTRACT

The present invention relates to a wavelength demultiplexer. More particularly, the present invention provides the wavelength demultiplexer with straight optical waveguide that minimizes the bending loss of optical waveguide caused in the wavelength demultiplexer. A wavelength demultiplexer with straight optical waveguide in accordance with the present invention comprises an optical power distributor, a plurality of optical waveguides, and an optical power combiner. The optical power distributor evenly divides multiplexed input light by intensity. The number of optical waveguide transmits the divided multiplexed light and causes constant optical path length differences among adjacent waveguides. The optical waveguide is straight optical waveguide and includes two parts of different effective refractive indices. The optical power combiner receives output signals of the plurality of optical waveguides and separates the output signals by phase.

1 Claim, 1 Drawing Sheet

WAVELENGTH DEMULTIPLEXER WITHOUT WAVEGUIDE BENDING LOSS

BACKGROUND OF THE INVENTION

1. Field of the Invention

The present invention relates to a wavelength demultiplexer. More particularly, the present invention provides the wavelength demultiplexer with straight optical waveguide that minimizes the bending loss of optical waveguide caused in the wavelength demultiplexer.

2. Description of the Conventional Art

In order to meet series of consumers' demand in information technology that increases day by day, high capacity and high-speed communication infrastructure are required. To fulfill such requirement, high-speed optical communications using optical fiber get popularized. However, in reality, switching systems of optical communication still depend on electronics components. To realize true high capacity and high-speed communication infrastructure, efficient optical switching systems need to be developed.

So far, light has been assumed to have one particular wavelength and many recent studies have been performed in the area of increasing the performance of the optical switching and routing device. Since wavelength division multiplexing technique was introduced, state of the art researches regarding optical communication has been concentrating on supplying multiplexed optical signals. Generally, materials used to implement wavelength demultiplexer are semiconductors, silica, and polymers. Among them, the widely used material to implement commercial wavelength demultiplexer is silica. Even though semiconductor has many advantages such that the demultiplexer implemented by semiconductor material may be integrated together with optical cross connector, multiplexer, and optical amplifier, it has a number of drawbacks like optical loss, and coupling loss. On the contrary, the silica demultiplexers have larger size than semiconductor demultiplexer does and monolithic integration with other devices is impossible. Nevertheless, the demultiplexer implemented by silica is widely used because internal loss and coupling loss of the waveguide is small.

If optical loss of the semiconductor demultiplexer can be reduced, semiconductor demultiplexer is to be used as a more efficient optical device.

The important points in the process of demultiplexing are low cross talk and efficient elimination of optical attenuation. The major problem of the conventional demultiplexers in wavelength division multiplexing implementation is optical loss at the output.

In large, there are three losses in loss category of the wavelength demultiplexer. They are material loss, structural loss, and insertion loss. Under the structural loss, there are waveguide propagation loss and loss from optical power splitter. The lengths of optical waveguides of the conventional wavelength demultiplexers differ with respect to different channels in order to reduce such losses. As a result, optical path length difference occurs and thereby each channel is to have waveguide bending structure of different bending radius of curvature from other channels. In other words, it is inevitable for the conventional wavelength demultiplexers to have optical waveguide bending structure.

Due to these bending losses, cross talk gets worse and thereby the implementation of semiconductor demultiplexer suffers. Moreover, due to the optical waveguide bending structure, overall size of the wavelength demultiplexer is big.

REFERENCES

1. U.S. Patent Documents
   U.S. Pat. No. 5,751,872, May 12, 1998, Wavelength demultiplexer
   U.S. Pat. No. 5,243,672, Sep. 07, 1993, Planar waveguide having optimized bend
   U.S. Pat. No. 5,675,675, Oct. 07, 1997, Bandwidth-adjusted wavelength demultiplexer
2. Other Publications
   IEEE Photonics Technology Letters, Vol. 10, No. 3, March 1998, pp. 379–381, J. C. Chen et al., "A Proposed Design for Ultra low Loss Waveguide Grating Routers".
   IEEE Photonics Technology Letters, Vol. 10, No. 3, March 1998, pp. 382–384, C. G. M. Vreeberg et al., "A Low-loss 16 Channel Polarization dispersion-compensated PHASAR Demultiplexer".
   IEE Electronics Letters, Vol. 30, No. 4, February 1994, pp. 300–302, M. R. Amersfoort et al., "Phased-array Wavelength Demultiplexer with flattened wavelength Response".
   IEEE Conference Proceedings of 11th LEOS Annual Meeting, Orlando, Fla., 1998, pp317–pp318, K-S, Hyun, B.-S, Yoo, and M.-H, Cho, "8 Channel Dispersion-controlled Phased Array Demultiplexer in InP/InGaAsP".

SUMMARY OF THE INVENTION

A wavelength demultiplexer with straight optical waveguide comprises an optical power distributor, a plurality of optical waveguides, and an optical power combiner. The optical power distributor evenly divides multiplexed input light by intensity. The number of optical waveguide transmits the divided multiplexed light and causes constant optical path length differences among adjacent waveguides. The optical waveguide is straight optical waveguide and includes two parts of different effective refractive indices. The optical power combiner receives output signals of the plurality of optical waveguides and separates the output signals by phase.

Desirably, two parts of different effective refractive indices in straight optical waveguide comprise two materials of different refractive indices.

Desirably, the two materials of different refractive indices are InGaAsP and InAlAsP.

Desirably, the straight optical waveguide comprises two parts of different waveguide widths.

Desirably, the two parts further comprises transition region of adiabatic transition to suppress reflection and mode change caused by refractive index difference at the edge of said two parts.

Desirably, the straight optical waveguides have unique difference in length of the two parts, the difference in length of the two parts in a straight optical waveguide being determined by following equation $$\Delta L_k = n_1 l_{1k,k+1} + n_2 l_{2k,k+1}$$

where $\Delta L_k$ is the optical path length difference of optical waveguides, $n_1$ is the effective refractive index of material 1, $n_2$ is the effective refractive index of material 2, $l_{1k,k+1}$ is the difference in length of adjacent optical waveguides of material 1, and $l_{2k,k+1}$ is the difference in length of adjacent optical waveguides of material 2.

DETAILED DESCRIPTION OF THE PREFERRED EMBODIMENTS

The embodiments of the present invention will be explained with reference to the accompanying drawings.

Two important capabilities of wavelength demultiplexer are to separate appropriate wavelength efficiently and to be used independently without additional control and amplification. To realize such capabilities, curves existing in the conventional demultiplexer need to be replaced by straight lines in order to reduce propagation loss and to remove the transition problems caused by the curves between transverse electric (TE) mode and transverse magnetic (TM) mode. It follows that wavelength resolution gets improved.

Figure 1:
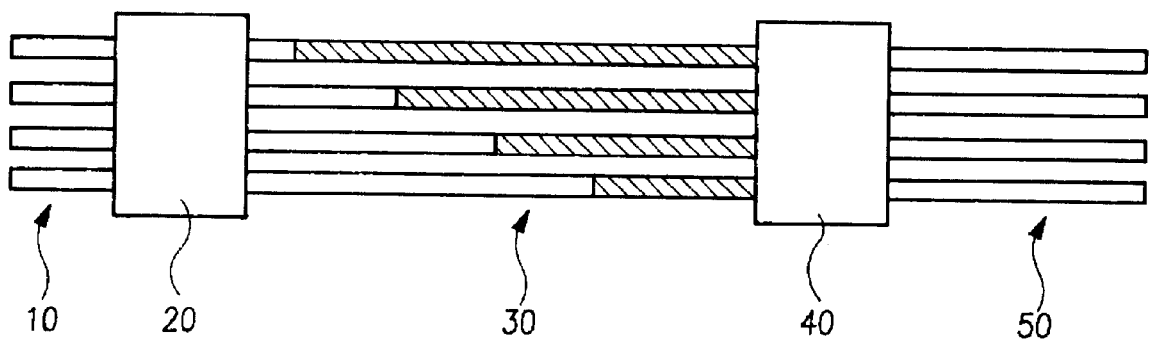
FIG. 1 shows a diagram for illustrating the structure of the wavelength demultiplexer in accordance with an embodiment of the present invention.

FIG. 1 shows a diagram for illustrating the structure of the wavelength demultiplexer in accordance with an embodiment of the present invention. In the figure, an input part 10 of multiplexed wavelengths is shown. N channel optical power distributor 20 evenly divides light supplied by the input part 10 in terms of intensity. Divided lights advance to the optical combiner 40 through m optical waveguides 30 with constant path length difference. The optical combiner 40 gathers lights from m optical waveguides with constant phase difference and generates demultiplexed lights to the output part 50.

Lights passed through a number of optical waveguides have constant optical path length difference and wavelengths with the same phase are gathered at the optical combiner 40 because of the optical path length difference. In conventional methods, optical path length difference has been adjusted by increasing or decreasing the length of the optical waveguide. In these cases, as the number of optical waveguides gets increased, bending radius of curvature and the length of the bending region gets increased. As results, incomplete interference of constructive or destructive may be occurred due to light intensity variation with respect to path and wavelength resolution gets deteriorated. In addition, the intensity of light output gets significantly reduced.

As shown in the FIG. 1, the present invention implements straight optical waveguide 30 with the help of structural change of optical waveguide and material with different effective refractive index. The present invention removes the curve region thoroughly and thereby prevents bending loss usually caused by the curve region.

As shown in the FIG. 1, m waveguide region includes waveguides with two different effective refractive index. Constant optical path length difference between waveguides is obtained by adjusting the difference of the length of effective refractive index part.

The method to implement two effective refractive indices at one optical waveguide is explained in detail as follows.

Figure 2A:
FIG. 2(a) shows a diagram for illustrating the structure of optical waveguide that includes materials of different effective refractive index.

FIG. 2(a) shows a diagram for illustrating the structure of optical waveguide that includes materials of different effective refractive index. In FIG. 2a, optical path length difference of different materials is obtained by equation 1.

$$\Delta L_k = n_1 l_{1k,k+1} + n_2 l_{2k,k+1} \quad \text{[Equation 1]}$$

where $n_1 l_{1k,k+1}$ is the difference in length of adjacent optical waveguides of material 1 and $n_2 l_{2k,k+1}$ is the difference in length of adjacent optical waveguides of material 2.

In the equation 1, if $\Delta L_k$ has constant value, phased array is made. As showing in the FIG. 2a, if waveguide is implemented by two materials 32, 34 of different effective refractive index, bending loss of optical waveguide is to be minimized. For example, the first material 32 is the material with the big effective refractive index ($n_{eff1}=n_1$) and the first material 34 is the material with the big effective refractive index ($n_{eff2}=n_2$).

The difference of effective refractive index ($n_1-n_2$) in III–V compound semiconductor is approximately 0.1. Generally, if refractive index of $n_1$ is supposed to be 3.3, reflected light intensity due to the refractive index difference is approximately 0.025% in case of normal incidence. Intensity of reflected light doesn't matter much. Desirably, InGaAsP may be used as the first material and InAlAsP may be used as the second material. Other compound semiconductors that have different composition may be used as well.

FIG. 2(a) shows a diagram for illustrating the structure of optical waveguide that includes materials of different effective refractive index.

The effective refractive indices of semiconductor demultiplexers vary as the width of waveguide changes. Using the characteristic of semiconductor demultiplexer, the present invention controls the width of waveguide and thereby implements optical waveguide that has more than two effective refractive indices.

Figure 2B:
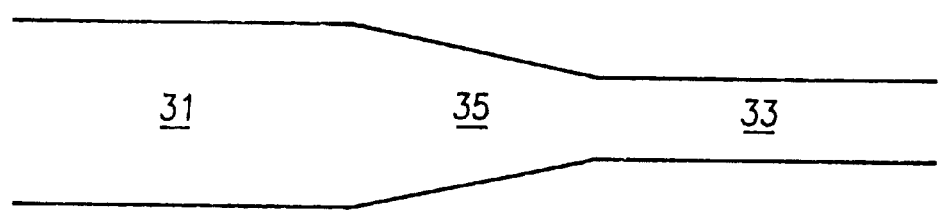
FIG. 2(b) shows a diagram for illustrating the structure of optical waveguide that includes same materials with different widths.

As shown in the FIG. 2(b), the region represented by 31 illustrates the region in which the width of the optical waveguide 30 is wide and thereby effective refractive index is high ($n_1$). The region represented by 33 illustrates the region in which the width of the optical waveguide 30 is narrow and thereby effective refractive index is low ($n_2$). The region represented by 35 illustrates the transition rate for adiabatic transition that doesn't change mode and reflection due to refractive index difference from interface.

As stated above, if the region that has two effective refractive indices can separate the optical waveguide 30, it is more advantageous than the one controls optical path length difference by adjusting the length. It provides the way to make straight the curve region or the same capability with less curve region. In addition, it reduces optical loss remarkably and increases separation with other wavelengths. As a result, major cause of error in optical communication is to be eliminated. Since multiplexed light is demultiplexed without leaking any light, loss of the input light is minimized and thereby supplementary expenditure like additional amplification is saved.

The present invention provides a wavelength demultiplexer that has features such as minimum optical loss and improved capability of low crosstalk. Therefore, errors caused in the optical communication are minimized and optical communication network is simply structured with the help of the minimum optical loss of the present invention.

In addition, the overall size of the demultiplexer is decreased and thereby manufacturing processes like packaging are simplified.

Although the preferred embodiments of the present invention have been disclosed for illustrative purposes, those skill in related art will appreciate that various modifications, additions and substitutions are possible, without departing from the scope and spirit of the invention as recited in the accompanying claims.

What is claimed is:

1. A wavelength demultiplexer:

an optical power distributor for evenly dividing multiplexed input light by intensity;

a plurality of optical waveguides for transmitting said divided multiplexed light and causing constant optical path length differences among adjacent waveguides, each optical waveguide comprising a straight optical waveguide and including two parts of different effective refractive indices, each of said straight optical waveguides having a unique difference in the length of said two parts, said difference in length of said two parts being determined by the following equation;

$$\Delta L_k = n_1 l_{1k,k+1} + n_2 l_{2k,k+1}$$

where $\Delta L_k$ is the optical path length difference of optical waveguides, $n_1$ is the effective refractive index of material 1, $n_2$ is the effective refractive index of material 2, $l_{1k,k+1}$ is the difference in length of adjacent optical waveguides of material 1, and $l_{2k,k+1}$ is the difference in length of adjacent optical waveguides of material 2; and an optical power combiner for receiving output signals of said plurality of optical waveguides and separating said output signals by phase.

* * * * *